United States Patent [19]

Takeuchi et al.

[11] Patent Number: 5,350,546
[45] Date of Patent: Sep. 27, 1994

[54] METHOD OF SETTING CONDITIONS OF MOLDING FOR INJECTION MOLDING MACHINE

[75] Inventors: Makoto Takeuchi; Shiji Aiba; Masatake Hoshina; Minoru Yamazaki, all of Nagano, Japan

[73] Assignee: Nissei Plastic Industrial Co., Ltd., Nagano, Japan

[21] Appl. No.: 934,264

[22] Filed: Aug. 25, 1992

[30] Foreign Application Priority Data

Aug. 30, 1991 [JP] Japan .................. 3-246734

[51] Int. Cl.$^5$ ............................. B29C 45/76
[52] U.S. Cl. .................. 264/40.1; 425/135; 425/140; 425/141; 364/476
[58] Field of Search ............ 264/40.1, 328.1; 425/135, 140, 141, 162, 169; 364/476

[56] References Cited

U.S. PATENT DOCUMENTS 5,035,598  7/1991  Fujita et al. ............... 264/40.7
5,176,858  1/1993  Tsukabe et al. ............. 264/40.6

FOREIGN PATENT DOCUMENTS 1291918  11/1989  Japan .

Primary Examiner—Jill L. Heitbrink

[57] ABSTRACT

Upon setting various molding conditions relating to new molding, one or more than two of pseudo-correlation data Q1, Q2, Q3, Q4, Q5 ... which are secondary physical values (a fluid pressure, a hold pressure, a pressure coefficient and the like) previously set in accordance with primary physical values (a thickness, a fluid length and the like) relating to a virtual molded article, and upon setting of the molding conditions, the molding conditions are computed from primary physical values relating to molding of an actual molded article in accordance with the correlation data Q1 ..., the molding conditions including a design condition for dies or a result of analysis of operation.

4 Claims, 3 Drawing Sheets

METHOD OF SETTING CONDITIONS OF MOLDING FOR INJECTION MOLDING MACHINE

FIELDS OF THE INVENTION

The present invention relates to a method of setting molding conditions for injection molding machine, which is effective in setting various molding conditions inherent to novel molding.

DESCRIPTION OF RELATED ART

In general, upon setting molding conditions, even though a single theoretical condition element is solely set, optimum molding conditions cannot be obtained since the relationship among respective conditions is complicated, and further, the theoretical setting thereof is very difficult since the respective conditions sensitively affect the quality of molded articles. After all, the setting of molding conditions should be in fact made with the help of judgments and intuition of an individual experienced and skilled operator, and it requires a long time with the repetitions of trial and error. Thus, there has been problems of causing a loss of a large quantity of materials and a loss of large energy.

Japanese Patent Application Laid-Open No. 209918-1988 proposes a method of setting molding conditions for an injection molding machine in order to solve the above-mentioned problems. In this method, data relating to dies or the like are inputted to a computer in order to search a data base or knowledge base which has been stored beforehand in memory and which relates to molding conditions so as to infer molding conditions adapted for the dies in order to set optimum molding conditions, thereby it is possible to simplify the setting work, to reduce a quantity of useless material and a loss of energy and to set precise molding conditions.

However, the method of setting molding conditions, disclosed in the above-mentioned application, requires the step of searching an extremely large volume of data in order to infer the optimum molding conditions or most resembling molding conditions, and accordingly, the larger the volume of data in the data base or in the knowledge base relating to the molding conditions, the more accurate the result of the searching or inferring can be obtained. Thus, the higher the expert system to be built up, the larger the volume of data is required. As a result, this method raises a problem to be improved such that it incurs larger size hardware such as memory or the like, a higher cost and a complicated programming procedure.

SUMMARY OF THE INVENTION

An object of the present invention is to provide a method of setting molding conditions for an injection molding machine, which can set molding conditions from a lesser amount of data, and which can remarkably miniaturize both hardware and software, and which can lower the cost thereof.

Further, another object of the present invention is to provide a method of setting molding conditions for an injection molding machine, which can set more precise molding conditions.

In order to achieve the above-mentioned objects, a method of setting molding conditions for an injection molding machine, is characterized by the steps of previously setting one or more than two of pseudo-correlating data Q1, Q2, Q3, Q4, Q5 ... which are secondary physical values (a fluid pressure, a hold pressure, a pressure coefficient and the like), in accordance with physical values (a wall thickness, a fluid length and the like) relating to molding of a virtual molded article U by use of an estimation element such as an intuition, experience or the like, and computing molding conditions (injection pressure and the like), upon setting the molding conditions, from primary physical values relating to an actual molded article in accordance with the correlation data Q1 .... In this case it is desirable to graphically exhibit the correlating data Q1, .... Further, the molding conditions include design conditions of dies, and the result of analysis for motion.

Accordingly, with the use of the estimation element such as intuition, experience or the like owned by a skilled operator, such pseudo-data that if, for example, the wall thickness D (a primary physical value) of the virtual molded article U made of specific resin is Dn (mm), the fluid pressure Pr (a secondary physical value) would be Prn (Kg/m$^2$), are collected for several difference wall thicknesses Dn ..., and accordingly, the pseudo-correlation data Q1, Q2, Q3, Q4, Q5 ... which are the secondary physical values are graphically exhibited with respect to the primary physical values relating to the molding of the virtual molded article U in accordance with the collected data, thereby the element such as intuition, experience or the like which is ambiguous is converted into a numerical value which is more legible.

Further, if a primary physical value such as a wall thickness Da, a fluid length La or the like, relating to an actual molded article is inputted upon setting molding conditions, an injection pressure or the like which is a desired molding condition can be computed from the correlation data Q1, Q2, Q3, Q4, Q5 ... which have been graphically exhibited.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Detailed explanation will be made hereinbelow of an optimum embodiment of the present invention with reference to the drawings.

Figure 7:
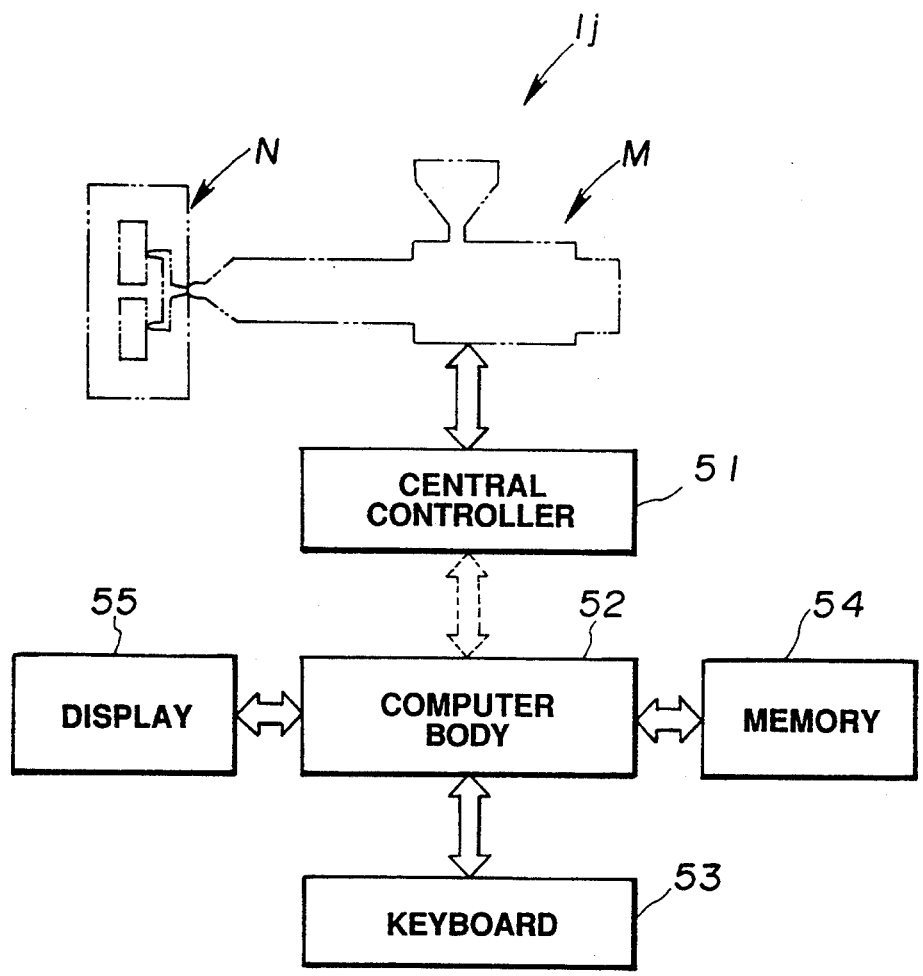
FIG. 7 is a schematic block diagram showing an injection molding machine which can carry out the molding condition setting method.

First, the outlined arrangement of the main section of an injection molding machine which can carry out a molding condition setting method according to the present invention will be explained with reference to FIG. 7.

In this figure, an injection molding machine body which is indicated by a phantom line is generally denoted by reference numeral Ij, incorporating an injection device M and dies N. A central controller 51 has a function of controlling the injection device M and the dies N. Meanwhile, a computer body 52 is connected thereto with the central controller 51, a keyboard 53, an external memory 54, a display 55 and the like.

Next, the molding condition setting method in this injection molding machine, according to the present invention will be explained with reference to FIGS. 1 through 7. It is noted that the case in which an injection pressure is set as a molding condition will be exemplified in this embodiment.

At first, with the use of intuition, experience or the like owned by an operator, for example, a fluid pressure, a hold pressure, a pressure coefficient, a flow rate coefficient and the like are set as pseudo-correlation data in accordance with a wall thickness, a fluid length, a flow rate of resin and the like relating to a virtual molded article.

Figure 1:
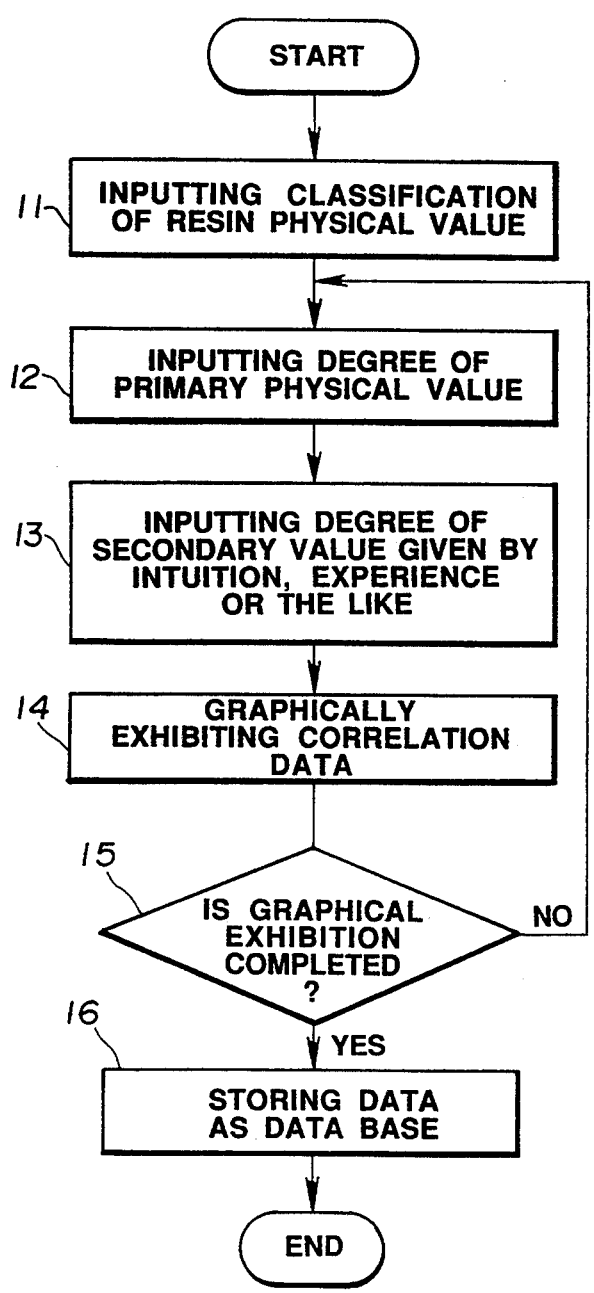
FIG. 1 is a flow-chart showing the steps of setting correlating data in a molding condition setting method according to the present invention.
Figure 3:
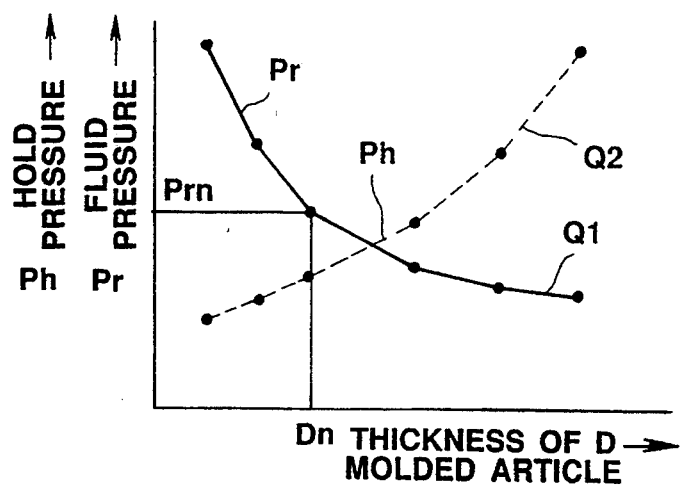
FIG. 3 is a graph showing correlation data used in the molding condition setting method.
Figure 6:
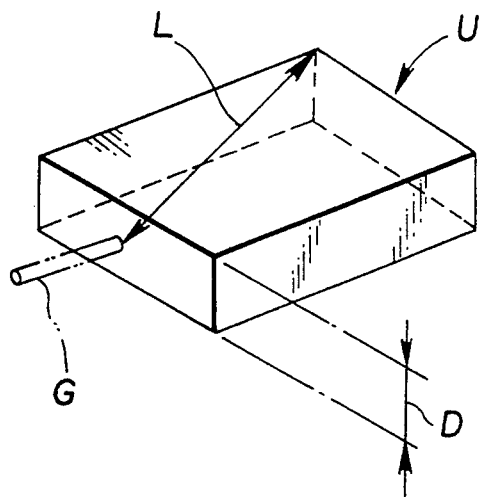
FIG. 6 is a schematic perspective view illustrating a virtual molded article used in the molding condition setting method.

FIG. 1 is a flow-chart showing the steps of setting such correlation data, which will be hereinbelow explained in due order. At first, the virtual molded article U having the gate G, as shown in FIG. 6 is set up, then the classification of a resin material is inputted from the keyboard 53, and the classifications of a primary physical value and a secondary physical value which is obtained from the primary physical value, that is, a wall thickness D as the primary value and a fluid pressure Pr as the secondary physical value in this case are inputted (step 11). Fluid pressure of the molten resin flowing through the injection molding machine M. Further, data based upon intuition or experience owned by the operator who knows that the fluid pressure Pr would be a out Prn (Kg/cm$^2$) if the wall thickness D is Dn (mm) are inputted. Specifically, the wall thickness Dn which is an arbitrary value is inputted from a keyboard 53 (step 12), and further, a value of the fluid pressure Prn in accordance with the wall thickness Dn is inputted (step 13). Such input steps are repeated for several different wall thickness Dn..., and accordingly, correlation data Q1 which are graphically shown in FIG. 3 are obtained (step 14). Further, after completion of graphically exhibiting the correlation data Q1, these data Q1 are stored in a memory (an internal memory or an external memory 54) (steps 15, 16). Incidentally, an estimation is made, in the above-mentioned setting steps, such that the fluid length L of the virtual molded article U is Lo (mm) which is a standard value. In this case, the fluid length L is that from the outlet of the gate G to a position in the die cavity, which is furthest from the outlet of the gate G, as shown in FIG. 6.

Figure 4:
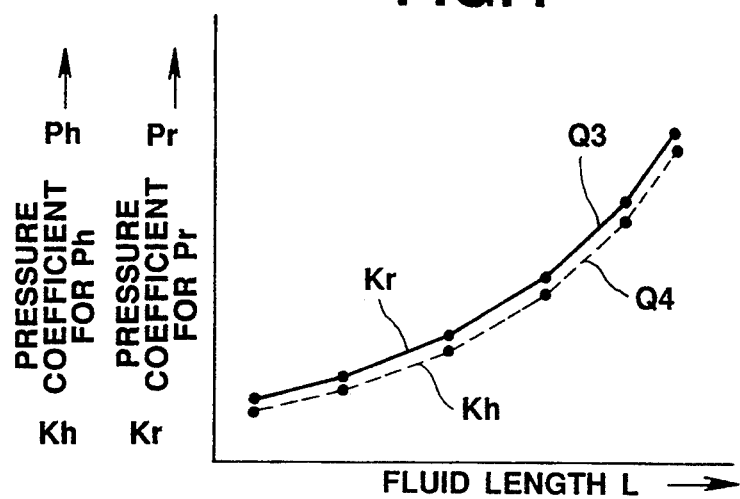
FIG. 4 is a graph showing other correlation data used in the molding condition setting method.
Figure 5:
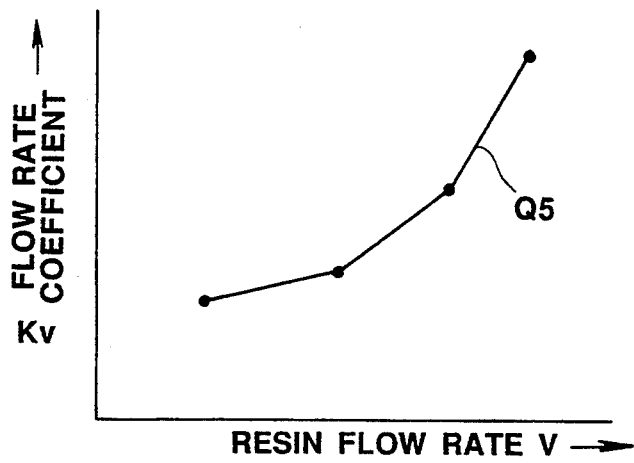
FIG. 5 is a graph showing other correlation data used in the molding condition setting method.

With similar steps, correlation data Q2 for a hold pressure Ph are obtained with respect to the wall thickness D, and are graphically exhibited as shown in FIG. 3(step 11 to 16). Further, correlation data Q3 corresponding to a pressure coefficient Kr with respect a fluid pressure Pr for the fluid length L, are graphically exhibited as shown in FIG. 4, and correlation data Q4 corresponding to a pressure coefficient Kh with respect to the hold pressure Ph for the fluid length L are obtained, and are graphically exhibited as shown in FIG. 4 (steps 11 to 16). In this case, the pressure coefficients Kr, Kh are set to such values that would be increased or decreased by a certain degree in comparison with the standard fluid length Lo (mm) if the fluid length is Ln (mm). Further, with similar steps, correlation data Q5 corresponding to a flow rate coefficient Kv are obtained with respect to a resin flow rate V, and are graphically exhibited as shown in FIG. 5 (steps 11 to 16).

Figure 2:
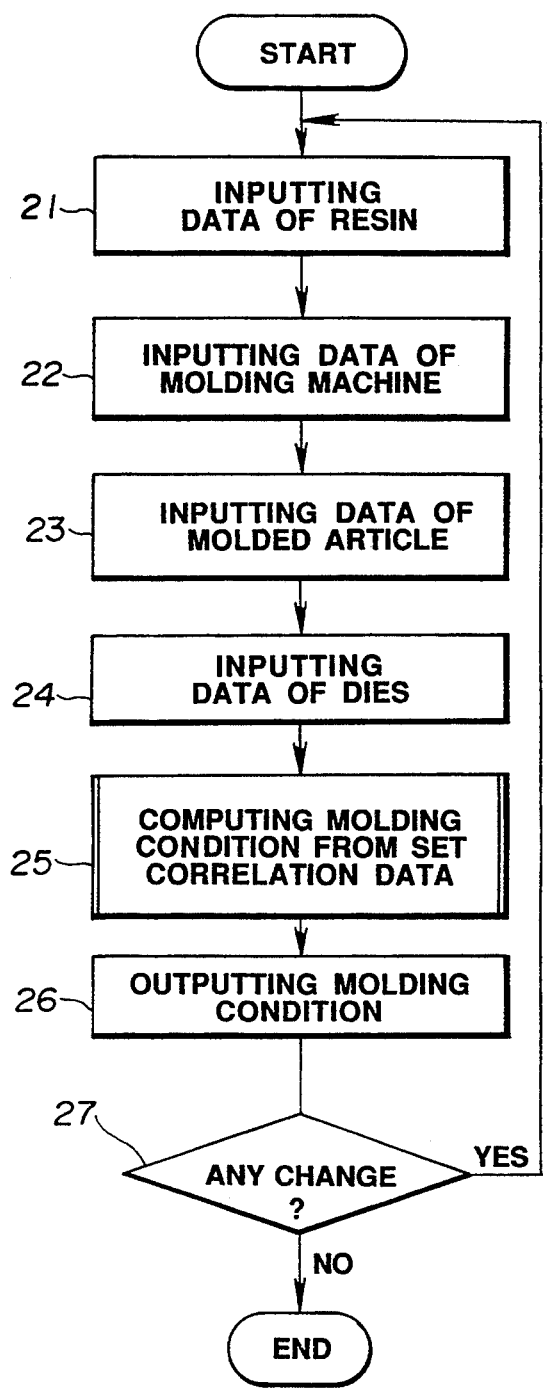
FIG. 2 is a flow-chart showing the setting steps in the molding condition setting method.

Further, with the use of the thus set several correlation data Q1..., the case of setting an injection pressure as a molding condition will be explained with reference to FIG. 2 which is a flow-chart showing the steps of setting molding conditions for an actual molded article. These steps will be specifically explained hereinbelow in due order.

At first, a classification of a resin material as resin a data is inputted (step 21), and a nozzle diameter, a screw diameter, a ram diameter of a cylinder and the like as data for the molding machine are inputted (step 22). Further, primary physical values such as a wall thickness (averaged value) Da, a fluid length La and the like which are data for the actual molded article, relating to the molding of the actual molded article are inputted, and further a runner diameter, a runner length, a gate diameter, a land length and the like as data for the dies are inputted (step 24).

Further, an injection pressure is calculated by the following process through the computation of the computer body 52 from several kinds of input data and the correlation data Q1... which have been already set (step 25).

First, a cavity internal pressure Pc is computed, that is, the cavity internal pressure Pc is obtained from the correlation data Q1 and Q3 by calculating Pc=Pra×Kra, where Pra is a fluid pressure corresponding to the wall thickness Da, and Kra is a pressure coefficient corresponding to the fluid length Ln. Accordingly, the pressure coefficient Kr is a coefficient for converting a fluid pressure in length Ln and thickness Da of the fluid into a cavity internal pressure. The pressure coefficient Kh is a coefficient for converting a fluid pressure in length Ln and thickness Da of the fluid into a cavity internal pressure.

Further, with the use of an arithmetic expression relating to pressure efficiency, a nozzle efficiency Hn, a runner efficiency Hr and a gate efficiency Hg which are given by real numerical values are calculated from the nozzle diameter, runner diameter, a runner length, a gate diameter and the land length, respectively, and further, a viscous efficiency of the resin material is calculated as a coefficient Km. Further, a flow rate coefficient is obtained as a coefficient Kv from the correlation data Q5. Accordingly, the resin pressure Pm is calculated by Pm=Pc/Hn×Hr×Hg×Km×Kv. It is noted that the above-mentioned cavity internal pressure Pc and resin pressure Pm are positioned as the result of analysis of motion.

Thus, the injection pressure (gauge pressure) Pi which is a desired molding condition is calculated by $Pi = Pm \times A^2/B^2$ Where A is a screw diameter given by a real numerical value, and B is a ram diameter given by a real numerical value. Further, the thus calculated injection pressure Pi is externally outputted through the indication on the display 55 or the like (step 26). It is noted that similar steps are taken for changing the result of the computation (step 27).

Thus, in the molding condition setting method according to the present invention, extremely ambiguous matters which have relied upon intuition or experience are numerically exhibited, and then the molding conditions are estimated being based upon the numerically exhibited values. Accordingly, this method can be used as an expert program in which appropriate molding conditions can be set with a small volume of data and the design can therefore be standardized.

It is noted that the present invention should not be limited to the above-mentioned embodiment, but for example, the hold pressure Ph can be similarly analyzed, and further, a gate diameter, a runner diameter, a spool diameter or the like can be analyzed with the use of an outlined volume of a molded article or the like as a primary physical value so as to design dies similarly.

Further, the correlation data can be readily reset by changing them with the use of peculiar numerical values known by the user. In addition, detailed arrangements, techniques and the like can be optionally changed and carried out without departing from the concept of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A molding condition setting method for injection molding machines comprising the steps of:
   determining a shape for a phantom molded article,
   selecting a plurality of magnitudes of primary physical values which can be directly set for the phantom molded article, the primary physical values include thickness of the phantom molded article and fluid length, the fluid length being selected as a distance from an outlet of a gate for a die cavity for the article to a position in the die cavity furthest from the outlet of the gate,
   inputting the magnitudes of the primary physical values into a computer,
   using each of the selected magnitudes of physical values to estimate magnitudes of secondary physical values to be generated after molding, the secondary physical values include fluid pressure, hold pressure and pressure coefficient to be generated after molding,
   inputting the magnitudes of secondary physical values into the computer,
   graphing pseudo-correlation data according to said primary physical values and said secondary physical values, the data being determined using the computer and being stored in a memory of the computer, and
   when molding is actually performed,
      inputting primary physical values of a molded article to be actually molded into the computer,
      determining secondary physical values corresponding to the inputted primary physical values according to the correlation data stored in said memory,
      calculating and setting actual molding conditions with the computer using the inputted primary physical values and the determined secondary physical values, and
      molding the article under the calculated and set molding conditions.

2. The molding condition setting method for injection molding machines according to claim 1, wherein the primary physical values further include a resin flow rate.

3. The molding condition setting method for injection molding machines according to claim 1, wherein the secondary physical values further include a flow rate coefficient.

4. The molding condition setting method for injection molding machines according to claim 1, further comprising the step of using a rectangular parallelepiped shape as the shape for the phantom molded article.

* * * * *